No. 768,654. Patented August 30, 1904.

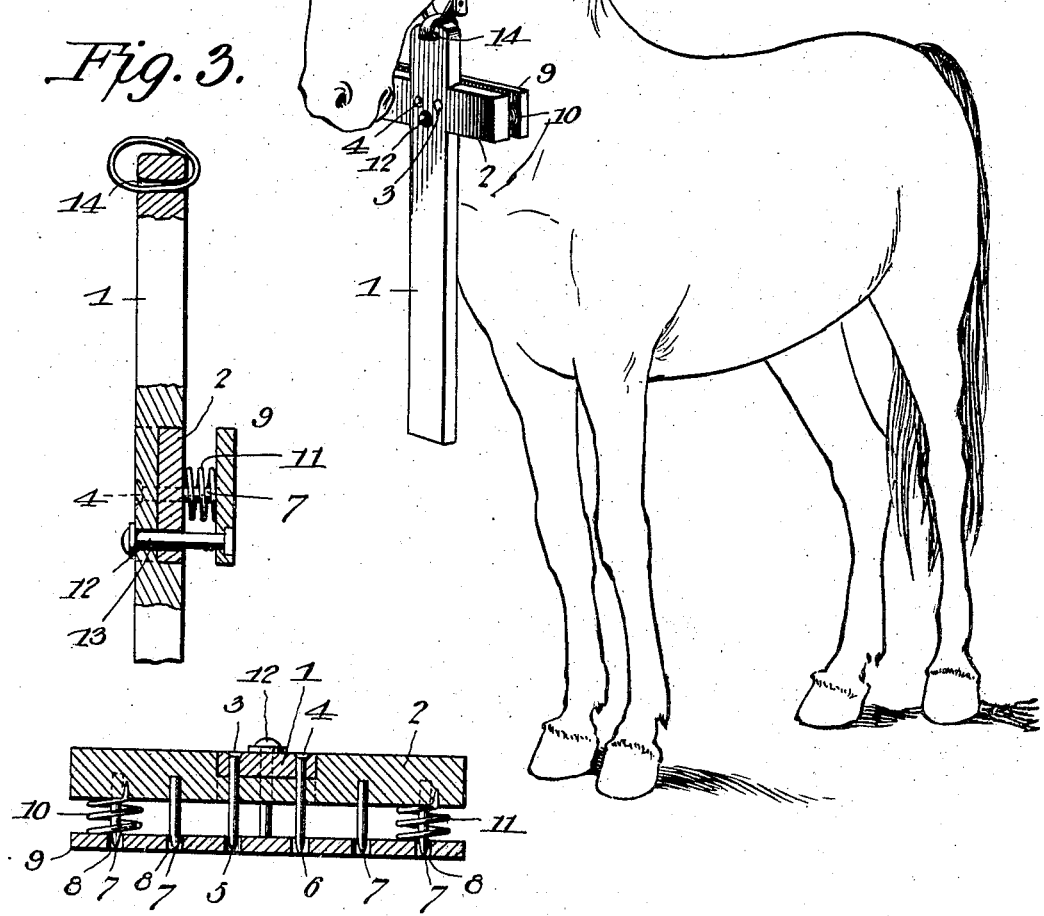

UNITED STATES PATENT OFFICE.

ANDREW CROSBIE, OF MILLINGTON, MICHIGAN.

ANIMAL-POKE.

SPECIFICATION forming part of Letters Patent No. 768,654, dated August 30, 1904.

Application filed November 4, 1903. Serial No. 179,838. (No model.)

*To all whom it may concern:*

Be it known that I, ANDREW CROSBIE, a citizen of the United States, residing at Millington, in the county of Tuscola and State of Michigan, have invented a new and useful Animal-Poke, of which the following is a specification.

This invention relates to animal-pokes, and it is primarily intended to be employed on horses, although it can be made of suitable proportions to suit the different kinds of animals.

One of the objects of the invention is to provide a poke which will be strong and durable and which will not be liable to become entangled in the adjacent obstructions nor abrade the neck or flesh of the animal on which it is placed.

Another object of the invention is to provide a poke the parts of which are capable of being easily assembled.

Further objects and advantages of this invention will appear in the following description, and the novel features thereof will be particularly pointed out in the appended claim, it being understood that changes in the form, proportion, and the minor details of construction may be resorted to without departing from the spirit or sacrificing any of the advantages of this invention.

In the drawings, Figure 1 represents a perspective view of the device applied. Fig. 2 represents a transverse section taken through the spur-carrying and fender arms. Fig. 3 represents a side elevation partly in section.

Referring now to the drawings by numerals of reference, 1 designates the longitudinal bar of the stock, which is recessed to receive an intermediately-disposed transverse bar 2, secured thereto by fastening devices 3 and 4, which pass through both bars and have extended ends 5 and 6, which constitute spurs to prick the animal under certain conditions to be referred to hereinafter. The two bars are connected by a "halved joint," so that by the aid of the fastening devices 3 and 4 the two bars will be secured together.

7 designates a plurality of spurs which are carried by the bar 2. They are disposed on either side of the fastening devices 3 and 4 and are in alinement therewith, so as to project through the holes 8 in the movable fender-bar 9, which is held away from the stock-bar 2 by coiled springs 10 and 11, coiled around the end spurs and terminally provided with spurs which are driven into the bar 2 to hold the spring in place. The outward movement of the bar 9 is limited by a headed rod 12, which is rigidly carried by the bar 9 and loosely projects through an opening 13 in the bars 1 and 2. This rod 12 permits the fender-bar to protect the ends of the spurs under normal conditions; but if pressure is applied to the bar 9 by the bar 1 coming in contact with a barrier or other obstruction the points of the spurs will be forced into contact with the flesh of the animal, so as to arrest further forward movement. The terminal opening 14 is for the purpose of attaching the poke to a suitable collar or neck-strap, whereby the poke may be retained in the proper place on the neck so as to assume the best operative position. This longitudinal bar, hanging straight down from the neck-strap, cannot be thrown by the animal over the fence to permit him to follow thereafter, and the upper end thereof being movably secured to a strap fastened around the small part of his neck, with the transverse bar arranged near the upper end of the longitudinal bar, avoids all danger of the horse or other animal getting his foot over the bar and injuring himself. The strap secured to the small portion of the neck prevents any backward or forward slipping of the device on the animal's neck and the consequent abrasion thereof, and it also holds the poke normally out of contact with the horse's neck and chest.

What I claim, and desire to secure by Letters Patent, is—

An animal-poke comprising a neck-encircling strap adapted to fit the small portion of an animal's neck, a longitudinal bar having a clevis at its upper end movably secured to said strap in position to loosely hang vertically in front of the animal's chest, a transverse bar secured to said longitudinal bar near the upper end thereof, a spring-pressed bar arranged parallel with said transverse bar, rigid spurs on one of said bars having free ends alining with openings in the other bar, a guide-rod rigidly carried by one of said bars and loosely movable in the other bar with a head on the loose end to limit the outward movement of the spring-pressed bar.

In testimony that I claim the foregoing as my own I have hereto affixed my signature in the presence of two witnesses.

ANDREW CROSBIE.

Witnesses:
P. L. VARNUM,
A. T. DALLEY.